Patented Aug. 1, 1933

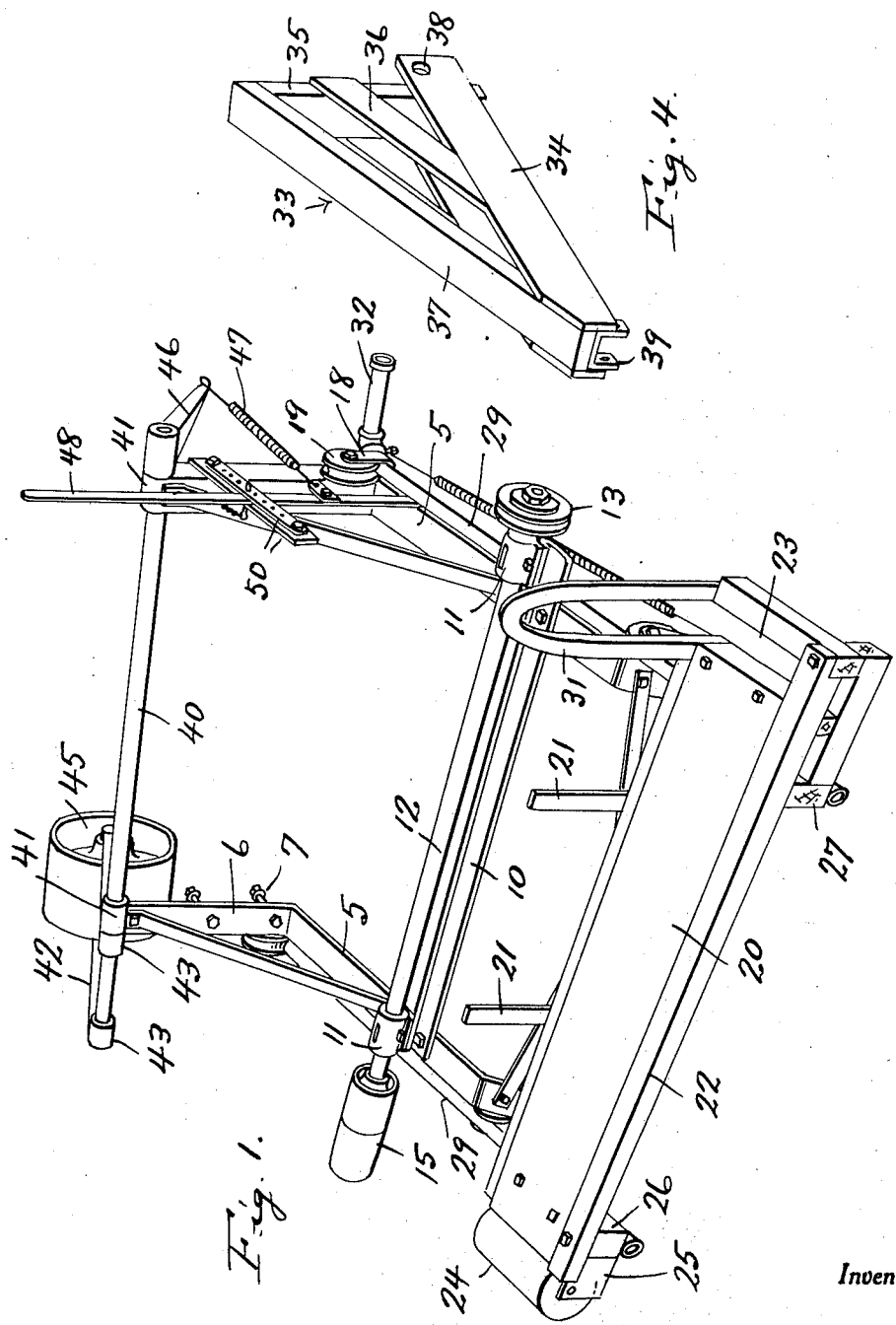

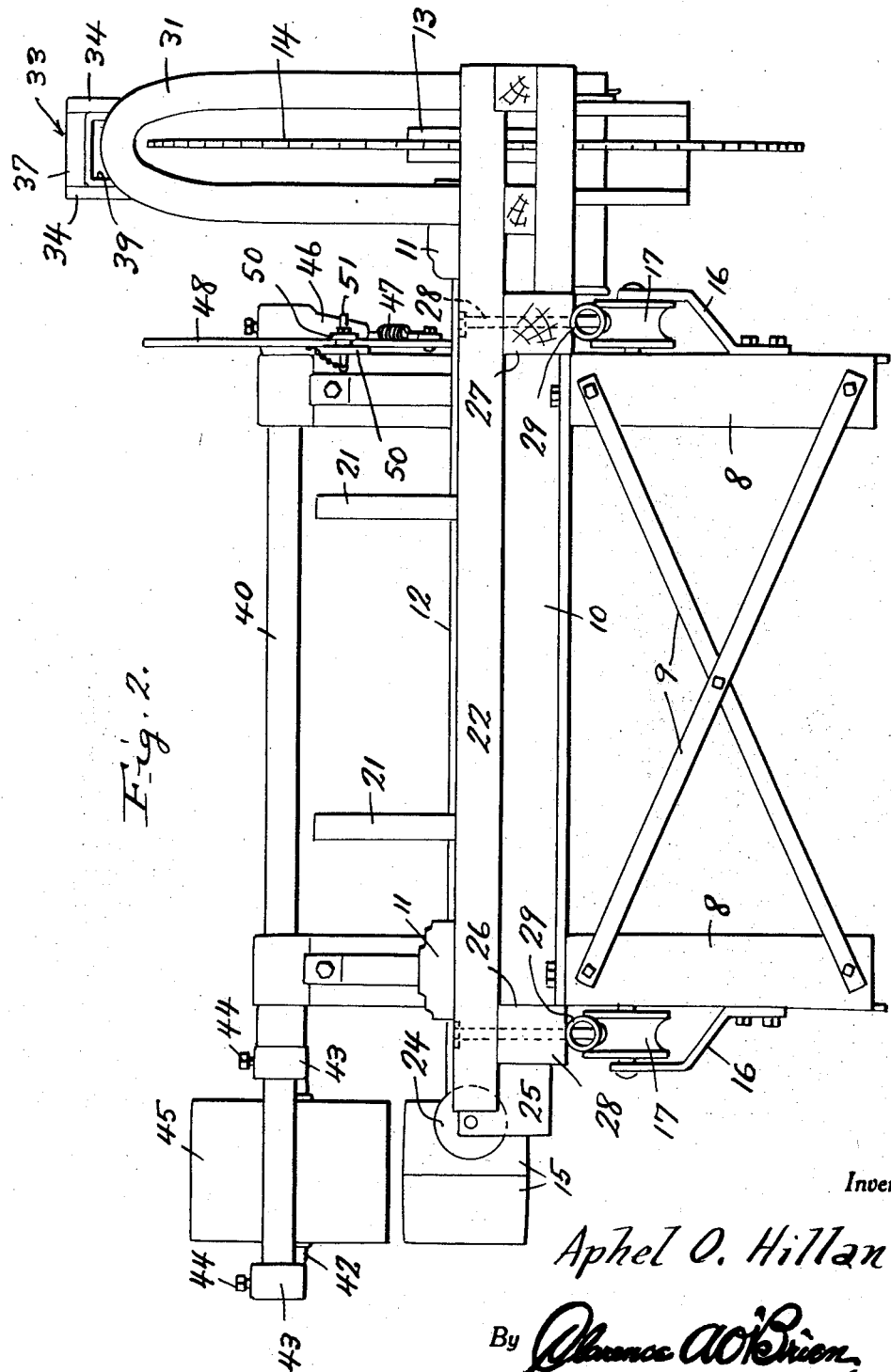

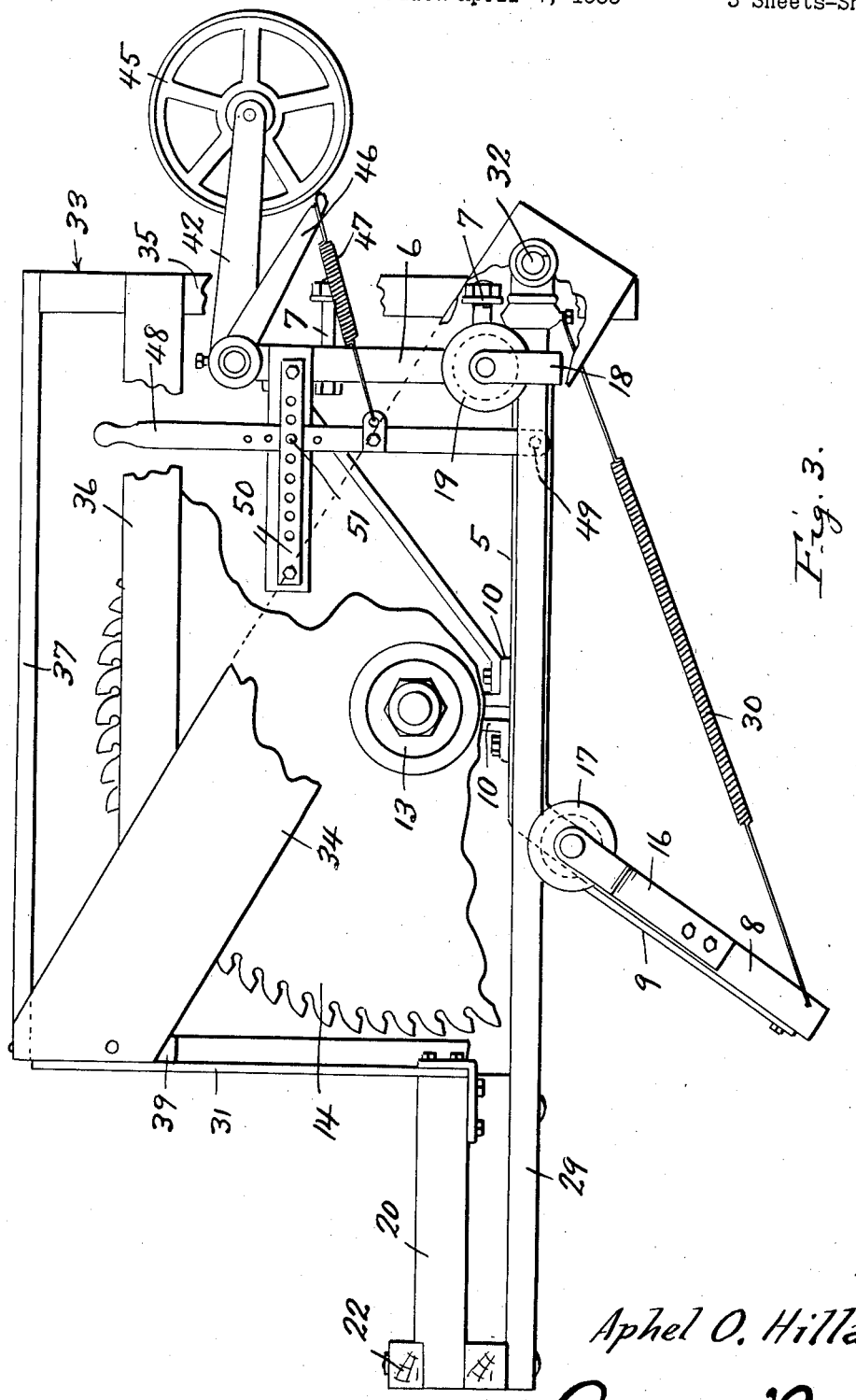

1,920,696

UNITED STATES PATENT OFFICE 1,920,696

SAW ATTACHMENT FOR TRACTORS

Aphel O. Hillan, Wentworth, S. Dak.

Application April 7, 1933. Serial No. 664,984

1 Claim. (Cl. 143—43)

This invention relates to improvements in tractor attachments and more particularly to a novel atachment for a tractor of a type in general use, which can be used for sawing and which has a rotary tool carrying member, means by which the tool carrying member may be driven from a rotary driving member on the tractor, and a sliding table or support for the work to be sawed mounted for advancing the work towards the saw.

The invention together with its numerous objects and advantages will be best understood from a study of the following description, taken in connection with the accompanying drawings wherein is illustrated a preferred embodiment of the invention.

It is to be understood at the outset that it is in no wise intended to restrict the invention to the specific combination, construction and arrangement of parts as illustrated and described other than will be necessary to meet the requirements of the prior art and the scope of the appended claim.

In the drawings:

Figure 1 is a perspective view of the attachment with the saw or cutting tool removed together with the guard for the saw.

Figure 2 is a front elevational view of the attachment with the saw and guard in position thereon.

Figure 3 is a side elevational view of the attachment with certain parts broken away and Figure 4 is a perspective view of the saw guard.

Referring to the drawings by reference numerals it will be seen that the attachment comprises a main supporting frame consisting of spaced parallel side bars 5—5 which are provided with upstanding ends 6 equipped with bolt and nut means 7 for securing the frame to the front of the tractor. At their forward ends the bars 5 merge into downwardly directed inclined extensions 8 connected together by crossed brace bars 9.

Secured to and extending between intermediate portions of the bars 5 are spaced parallel angle bars 10 which support at their ends bearings 11 and journalled in the bearings 11 are the end portions of a shaft 12. At one end thereof the shaft 12 is provided with clamp means 13 for securing the circular saw 14 to the shaft for rotation therewith, while at a relatively opposite end the shaft 12 is equipped with pulley means 15 whereby provision is made for a belt drive connection between the shaft 12 and a rotary driving member on the tractor.

On the extensions 8 of the frame bars 5 are provided brackets 16 which support grooved guide wheels 17. On the vertical extensions 6 of the guide bars 5 are brackets 18 which support grooved guide wheels 19 disposed in a plane above the wheels 17.

A work supporting table 20 is disposed at the front end of the main frame and extends transversely thereof. The table 20 is made of wood or of other suitable material and on the rear longitudinal edge thereof is provided with vertical posts 21 against which the work engages. At its front longitudinal edge the table 20 is provided with a longitudinal cleat 22 that cooperates with the posts 21 for holding the timber against lateral movement relative to the table.

To facilitate sliding the timber lengthwise of the table in the direction of the slot 23 provided at one end of the table for accommodating the saw, there is provided at the end of the table remote from the slot 23 a roller 24 journalled in brackets 25 secured to and extending laterally from one of the end transverse cleats 26 provided at the under side of the table. Inwardly from the slot 23 the table 20 is provided with a second transverse cleat 27 and secured to the cleats 26, 27 through the medium of bolts 28 are corresponding ends of tubular rods 29. The rods 29 extend rearwardly and engage the guide wheels 17 and 19 as shown, and in a manner to support the table 20 for movement toward and away from the saw 14.

The table 20 is normally urged into a retracted position through the medium of a suitable spring device 30 that is secured at one end to the extension 8 of one of the frame bars 5 and at a relatively opposite end to one of the rods 29 as will be clear from a study of Figure 3.

Secured to the table 20 and rising vertically therefrom in operative position to the notch 23 is an inverted U-shaped frame 31 that is preferably formed on angle iron. The rod 29 which is on the same side of the device as the guard 31 at its free end is provided with a lateral arm or extension 32 between which and the frame 31 a guard 33 for the saw is supported. The guard 33 as clearly shown in Figure 4 comprises a pair of side members 34 secured at one end to a vertical end member 35 and braced with respect to the end member 35 through the medium of diagonal braces 36. At their free ends the side pieces 34 receive therebetween and are secured to one end of a top piece or member 37 that is also secured to the upper end of the end member 35. At their rear ends the side members 34 project beyond the end member 35 and are provided with openings 38 to receive the extension 32. Between the ends of the side members 34 secured to the top member 37 is provided a U-shaped bracket 39 that is adapted to be bolted or otherwise secured to the frame 31 at the upper end of the frame in a manner suggested in Figure 3. It will thus be seen that the guard 33 when positioned on the device will be supported in a manner to afford a shield for the upper portion of the saw 14. (See Figure 3.)

A belt tightener is also provided, and the same comprises a shaft 40 journalled in bearings 41 provided on the upper ends of the bar extensions 6. A substantially U-shaped pulley supporting frame 42 has the sides thereof equipped with sleeves 43 secured to one end of the shaft 40 through the medium of set screws or similar fastening devices 44. Journalled on the frame 42 at the closed end of the U is a pulley 45 that as is thought apparent, is adapted to engage the upper run of the pulley belt (not shown) for taking up slack in the belt.

The shaft 40 is normally urged to rotate in a clockwise direction for engaging the pulley 45 with the belt through the medium of an arm 46 provided on the end of the shaft 40 remote from the pulley 45 and a spring 47 connecting the arm 46 with a hand lever 48 that is pivoted at its lower end to an adjacent frame member 5 as at 49.

The upper portion of the lever 48 operates between a pair of suitably mounted horizontal guide bars 50 which are provided with registering apertures as clearly suggested in Figure 3. An intermediate portion of the lever 48 is also provided with a series of apertures, and through the medium of a pin 51 adapted to be engaged with the registering apertures in the bars 50 and lever 48, the said lever is secured at the desired adjustment for varying the tension of the spring 47.

In actual practice the device is mounted on the front of the tractor in a manner hereinbefore suggested and the log to be cut is placed lengthwise on the table 20. Obviously as the saw 14 revolves and cuts into the log the table 20 is shoved or pushed in the direction of the saw 14 by the operator and against the action of the spring 30 to complete the sawing of the timber or work. When the saw cut has been completed the table will move to a retracted position away from the saw 14 under the action of spring 30. When the table is in a retracted position the log or work may be then shifted lengthwise of the table, the roller 24 facilitating the shifting of the log so as to bring a succeeding portion of the log into position across the slot 23 after which the sawing operation is again repeated.

It will be apparent from the foregoing that a device of this character may be readily attached to the tractor, will permit and facilitate the sawing of heavy timbers and further, can be supported on a tractor at a sufficient elevation so as not to interfere with the movement of the tractor.

Having thus described my invention, what I claim as new is:

In a saw attachment for tractors, a frame structure, means for securing the frame structure to the tractor frame, guide means mounted on the frame structure, rods engaging the guide means for movement longitudinally relative to the supporting frame structure, a log supporting table mounted on one end of the rods for movement therewith and having one end thereof extending laterally beyond the supporting frame structure, and provided in said extended end with a saw accommodating slot, a saw mounted on the frame structure and disposed laterally thereof at the side of the frame structure beyond which said one end of the log supporting table extends, to be accommodated in said slot upon movement of the log supporting table toward the saw, a lateral extension on the free end of one of said rods, a U-shaped standard secured at one end thereof to the extended end of the saw table, a saw guard pivoted at one end to the said lateral extension of said one rod, and inter-engaging means on the upper end of said standard and the free end of the saw guard for securing said last-named end of the saw guard to the standard for supporting the guard between said standard and lateral extension on said one rod in operative position to said saw.

APHEL O. HILLAN.